UNITED STATES PATENT OFFICE.

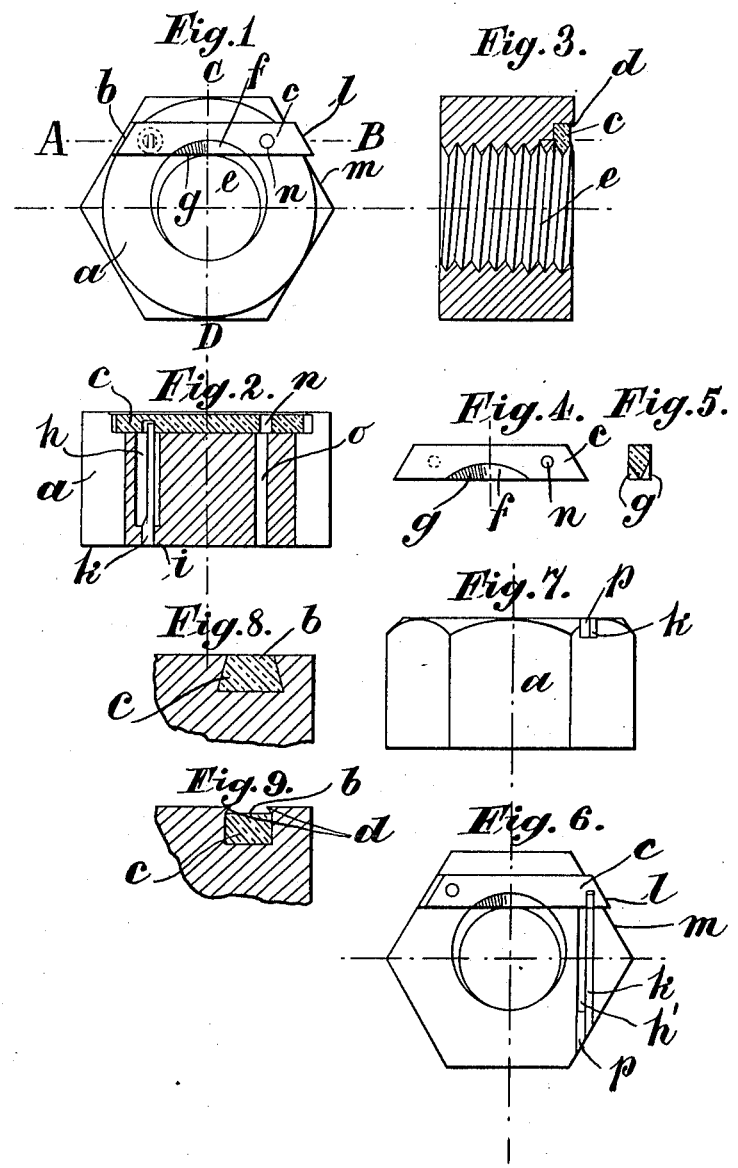

FREDERICK MOORE, OF STOKE NEWINGTON, LONDON, ENGLAND.

SELF-LOCKING NUT.

1,022,201.  Specification of Letters Patent.  Patented Apr. 2, 1912.

Application filed November 25, 1910. Serial No. 594,178.

*To all whom it may concern:*

Be it known that I, FREDERICK MOORE, a subject of the King of England, residing at 6 Howard road, Stoke Newington, London, England, have invented certain new and useful Improvements in or Relating to Self-Locking Nuts, of which the following is a specification.

This invention relates to lock nuts of the type in which a bar is slid transversely in the nut so as to engage with the thread of the bolt in order that any tendency for the nut to unscrew or rotate in a direction corresponding to a slackening of the nut on the bolt, is firmly resisted by the bar jamming in the threads of the bolt.

The object of the present invention is to provide a lock nut of the above type capable of being economically manufactured and having a locking bar so arranged that, when the nut is rotated in one direction, the bar automatically recedes and leaves the nut free to move, but when any attempt is made to rotate the nut in the opposite direction, the locking bar wedges or jams in the thread of the bolt and movement of the nut is prevented.

The present invention consists in fitting a transverse locking bar in a slot in the nut, providing the bar with an edge conforming to part of the screw thread of the nut and normally maintaining said bar in engagement with the thread of the bolt by means of a spring arranged in a suitable recess or hole in the nut substantially at right angles to the locking bar.

The invention also consists in providing part of the engaging edge of the bar with serrations or the like so as to increase the gripping or locking action.

The invention further comprises other details hereinafter referred to.

In the accompanying drawings, Figure 1 is a plan of one form of lock nut according to the invention. Fig. 2 is a sectional elevation on A—B, Fig. 1. Fig. 3 is a sectional elevation on C—D Fig. 1. Figs. 4 and 5 are respectively a plan and a cross section of the locking bar removed from the nut. Figs. 6 and 7 are respectively a plan and a front elevation illustrating a modification. Figs. 8 and 9 are detail cross sections illustrating two forms of bar and slot for the same.

In carrying out the invention according to one mode and as illustrated in Figs. 1 to 5, a nut $a$, is slotted transversely in its upper or lower face as at $b$. The slot $b$, is preferably of rectangular cross section and a locking bar $c$, of corresponding form is fitted therein. The bar $c$, is free to slide longitudinally, but is prevented from moving otherwise by the edges $d$, of the slot $b$, being rolled or otherwise forced over as indicated in Figs. 3 and 9. This arrangement is more economical than forming the slot $b$, and bar $c$, of dovetail form as indicated in Fig. 8 although the invention is to be considered as including the latter arrangement. The slot $b$, intersects the bolt hole $e$, and the locking edge $f$ of the bar adjacent to the hole is curved to conform substantially to the curvature of the screw thread in the threaded hole of the nut, but at the same time permit a small lateral movement of the locking bar. The edge $f$, is further formed to conform to the shape of the thread illustrated *i. e.*, V shape and the two sloping faces of the curved edge so formed are serrated or roughened with file marks but only on that side of the center line C D (Fig. 1) of the arc of curvature of the locking edge which would be foremost in the direction of undesired rotation of the nut. The serrations are pressed into engagement by means of a spring and the engaging surface is not merely a point but extends over a part of the thread owing to the substantial conformity of the curvature of the locking edge with that of the thread in the nut.

A hole $h$, is drilled in the nut $a$, substantially at right angles to the bar $c$, and preferably so as to leave a portion of metal $i$, at the bottom into which one end of a tempered steel wire spring $k$, is inserted. The other end of the spring is inserted into the bar $c$, and when a round wire spring is used, the end which enters the bar $c$, is preferably flattened. The spring $k$, tends to slide the bar so as to bring its serrated edge into engagement with the thread of the bolt. The bar $c$, is preferably of such length that when its serrated edge is engaging the thread of the bolt, the end $l$, projects beyond the adjacent face $m$, of the nut so that the bar may be readily disengaged for instance, by the application of a spanner to that face of the nut. It may be held temporarily in the disengaged position by a pin or the like inserted in a hole $n$, in the bar $c$, and in a hole $o$, in the nut, the two holes coinciding when the bar is in the disengaged position. When the pin is withdrawn, the bar c, automatically engages the thread of the bolt under the action of the spring k, and any tendency for the nut to unscrew results in the serrated edge of the bar wedging or jamming in the thread of the bolt so that slackening of the nut is firmly resisted. On the other hand when the nut is rotated in the opposite direction to screw in onto the bolt, the bar c, automatically recedes, the spring yielding to this operation.

The hole h, for the spring k, may be drilled in any suitable position in the nut so long as it is substantially at right angles to the bar and intersects the slot b; or the spring k, may lie in a slot h', in the face of the nut as indicated in Figs. 6 and 7, one end of the spring being secured by a wedge p, or otherwise.

I claim:—

1. In combination with a threaded nut having a slot thereon, means for locking said nut from rotation in one direction only comprising a bar slidable in said slot, a curved edge on said bar, said edge being curved substantially to conform to the curvature of the thread with which it engages but to permit a limited amount of sliding movement and said edge being shaped to conform to the shape of the thread, surface serrations on that side of the center line of the arc of curvature of the said edge which is foremost in the direction of undesired rotation and a spring normally pressing said serrations into engagement with the thread.

2. In combination with a threaded nut having a slot on the exterior thereof, means for locking said nut from rotation in one direction only comprising a bar slidable in said slot, a curved edge on said bar, said edge being curved substantially to conform to the curvature of the thread with which it engages but to permit a limited amount of sliding movement and said edge being shaped to conform to the shape of the thread, surface serrations on that side of the center line of the arc of curvature of the said edge which is foremost in the direction of undesired rotation and a flat spring disposed in an opening in the nut at right angles to the direction of sliding of the locking bar and arranged to press said serrations on the locking bar into engagement with the thread.

3. In combination with a threaded nut having a slot on the exterior thereof, means for locking said nut from rotation in one direction only comprising a bar slidable in said slot, a curved edge on said bar, said edge being curved substantially to conform to the curvature of the thread with which it engages but to permit a limited amount of sliding movement and said edge being shaped to conform to the shape of the thread, surface serrations on that side of the center line of the arc of curvature of the said edge which is foremost in the direction of undesired rotation, said locking bar and nut having holes therein adapted to register in the disengaged position of said bar when the serrated side is in inoperative position, and a member adapted to engage in said holes to hold said bar in inoperative position.

4. In combination with a threaded nut having a rectangular slot on the exterior thereof, means for locking said nut from rotation in one direction only, comprising a rectangular bar slidable in said slot, a forced over upper edge on said slot to retain said bar, a curved edge on said bar, said edge being curved substantially to conform to the curvature of the thread with which it engages but to permit a limited amount of sliding movement and said edge being shaped to conform to the shape of the thread, surface serrations on that side of the center line of the arc of curvature of the said edge which is foremost in the direction of undesired rotation, said locking bar and nut having holes therein adapted to register in the disengaged position of said bar when the serrated side is in inoperative position, and a member adapted to engage in said holes to hold said bar in inoperative position.

In testimony whereof I affix my signature in presence of two witnesses.

FREDERICK MOORE.

Witnesses:
 EDWARD TILSTON,
 DUDLEY VIZE.

---

Copies of this patent may be obtained for five cents each, by addressing the "Commissioner of Patents, Washington, D. C."